US010542806B2

(12) United States Patent
Tayne

(10) Patent No.: US 10,542,806 B2
(45) Date of Patent: Jan. 28, 2020

(54) PULL HANDLE FOR A ROLLING CASE

(71) Applicant: Becklin Holdings, Inc., Grants Pass, OR (US)

(72) Inventor: Adrian Tayne, Grants Pass, OR (US)

(73) Assignee: Becklin Holdings, Inc., Grants Pass, OR (US)

(*) Notice: Subject to any disclaimer, the term of this patent is extended or adjusted under 35 U.S.C. 154(b) by 92 days.

(21) Appl. No.: 15/963,065

(22) Filed: Apr. 25, 2018

(65) Prior Publication Data

US 2019/0328099 A1    Oct. 31, 2019

(51) Int. Cl.
| | | |
|---|---|---|
| *B62B 1/00* | (2006.01) | |
| *A45C 13/26* | (2006.01) | |
| *B62B 5/06* | (2006.01) | |
| *A45C 5/03* | (2006.01) | |
| *A45C 5/14* | (2006.01) | |

(52) U.S. Cl.
CPC .............. *A45C 13/262* (2013.01); *A45C 5/03* (2013.01); *A45C 5/14* (2013.01); *B62B 5/065* (2013.01); *B62B 5/067* (2013.01); *A45C 2013/267* (2013.01)

(58) Field of Classification Search
CPC ..... A45C 13/262; A45C 13/267; A45C 13/26; A45C 13/00; A45C 5/03; A45C 5/04; A45C 5/14; A45C 5/146; A45C 7/00; A45C 9/00; A45C 2013/267; B62B 5/065; B62B 5/067
See application file for complete search history.

(56) References Cited

U.S. PATENT DOCUMENTS

| | | | |
|---|---|---|---|
| 5,330,037 | A | 7/1994 | Wang |
| 5,482,147 | A | 1/1996 | Wang |
| 6,176,357 | B1 | 1/2001 | Kuo |
| 6,196,366 | B1 | 3/2001 | Lin |
| 6,405,407 | B1 | 6/2002 | Chen |
| D497,480 | S | 10/2004 | Drew et al. |

(Continued)

FOREIGN PATENT DOCUMENTS

| | | |
|---|---|---|
| AU | 2015255251 | 5/2016 |
| CN | 105460137 | 4/2016 |

OTHER PUBLICATIONS

International Search Report and Written Opinion of the International Searching Authority completed Jun. 11, 2019, in International Patent Application No. PCT/US2019/022000, 7 pages.

*Primary Examiner* — Raymond Alejandro
(74) *Attorney, Agent, or Firm* — Lowe Graham Jones PLLC

(57) ABSTRACT

A handle assembly includes a sheath mounted to a corner of a suitcase. Telescoping shafts secure within the sheath and have non-round shapes to prevent rotation, such as a hexagonal shape. A handle secures to an end shaft of the telescoping shafts and extends perpendicular to the longitudinal axis of the telescoping shafts. A latching mechanism mounts to the sheaths and engages each shaft of the telescoping shafts when they are retracted. The latching mechanism engages a middle shaft of the telescoping shafts when extended. A detent engages between the telescoping shafts when extended and resists insertion of the end shaft into the middle shaft. The handle assembly may be mounted to one of two lids on left and right sides a suitcase with the handle being mounted to one of the lids.

20 Claims, 34 Drawing Sheets

(56) References Cited

U.S. PATENT DOCUMENTS

| | | | |
|---|---|---|---|
| D570,601 S | 6/2008 | Drew et al. | |
| D806,394 S | 1/2018 | Liang | |
| 2015/0084295 A1* | 3/2015 | Ben Meir | A45C 5/146 |
| | | | 280/37 |
| 2015/0208779 A1* | 7/2015 | Tong | A45C 13/26 |
| | | | 16/113.1 |
| 2016/0338461 A1* | 11/2016 | Chiang | A45C 13/262 |

* cited by examiner

12a

PULL HANDLE FOR A ROLLING CASE

FIELD OF THE INVENTION

This invention relates to luggage and, in particular, to rolling carry-on luggage.

BACKGROUND OF THE INVENTION

Cases and luggage that are designed to be carried onto a commercial airplane must comply with dimensional size limits established by each airline company. Ideally, the storage capacity of the case should be as close as possible to the volume defined by the external dimensional requirements.

The case and pull handle disclosed herein provide an improved approach that increases the usable volume of the case.

SUMMARY OF THE INVENTION

In one aspect of the invention, an apparatus includes a case body defining an interior volume for storage, the case body having a top surface, a bottom surface, a front surface, a rear surface, a left surface, and a right surface, the top, bottom, front, rear, left, and right surfaces substantially conforming to a cuboid shape. One and only one pull rod is mounted to the case body and positioned along a first edge of the cuboid shape. In some embodiments, the first edge is positioned between the rear surface and one of the right surface and the left surface. One or more rollers are mounted to the case body, such as at a second edge of the cuboid shape positioned between the front surface and the bottom surface.

In some embodiments, the case body includes a central portion, a left lid, and a right lid, the left lid defining the left surface and the right lid defining the right surface. The pull rod may be mounted to one of the right lid and the left lid. The one or more rollers comprise a left roller mounted to the left lid and a right roller mounted to the right lid.

In some embodiments, the pull rod includes multiple telescoping sections. Each telescoping section of the multiple telescoping sections may have a non-round shape. For example, the non-round shape may include surfaces defining a hexagon. The latch may be secured to the case body and selectively engage the multiple telescoping sections in a retracted position.

A detent may be secured to a first section of the multiple telescoping sections and engage an aperture in a second section of the multiple telescoping sections when the multiple telescoping sections are in an extended position.

A handle may secure to the pull rod and extend inwardly from the first edge parallel to a second edge that is perpendicular to the first edge such that the pull rod and handle define an 'L' shape, the second edge being between the top surface and one of the right surface and the left surface.

In some embodiments, the case body defines an indentation at the first edge sized to receive the pull rod.

In some embodiments, the pull rod includes a static sleeve mounted in the indentation and one or more telescoping sections slidably secured within the static sleeve.

BRIEF DESCRIPTION OF THE DRAWINGS

Preferred and alternative examples of the present invention are described in detail below with reference to the following drawings:

FIG. 1OF is a top view of the case of FIG. 6 with the handle extended;

DETAILED DESCRIPTION OF THE PREFERRED EMBODIMENT

Figure 1A:
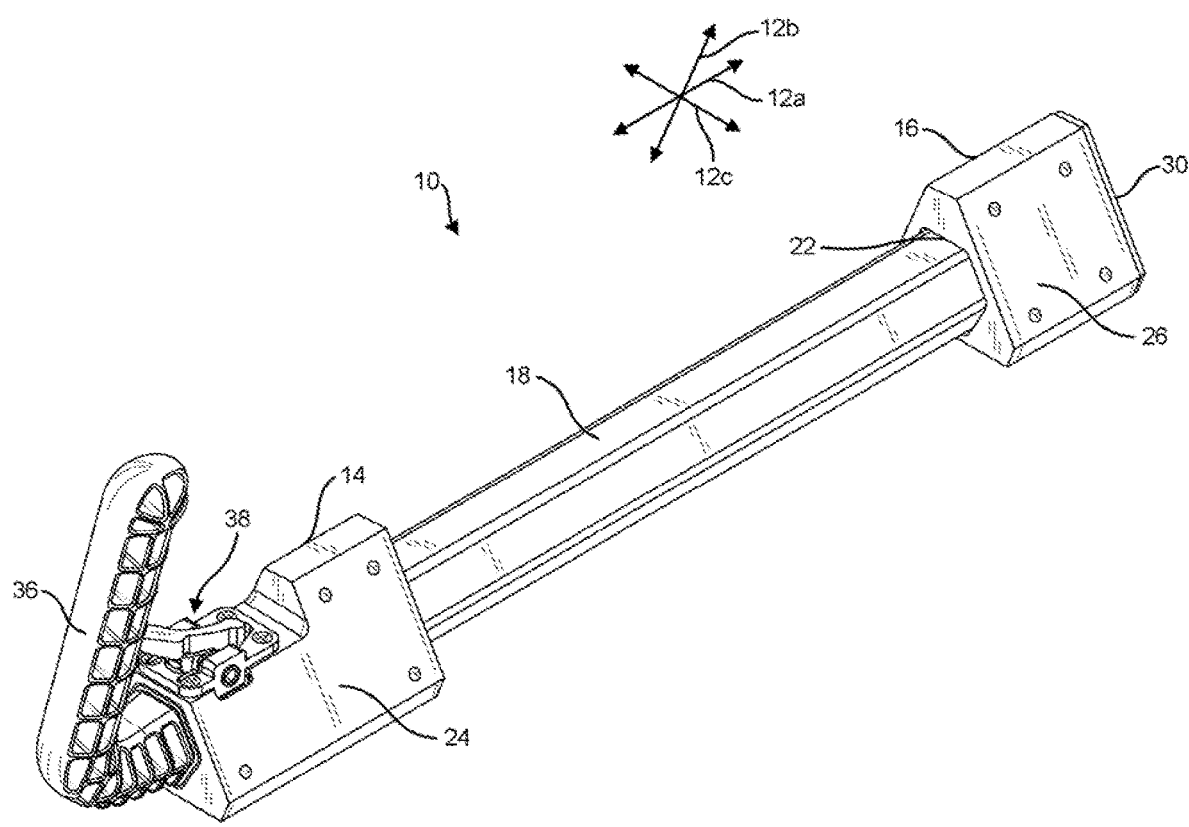
FIGS. 1A and 1B are isometric views of a handle assembly in accordance with an embodiment of the present invention.
Figure 1B:
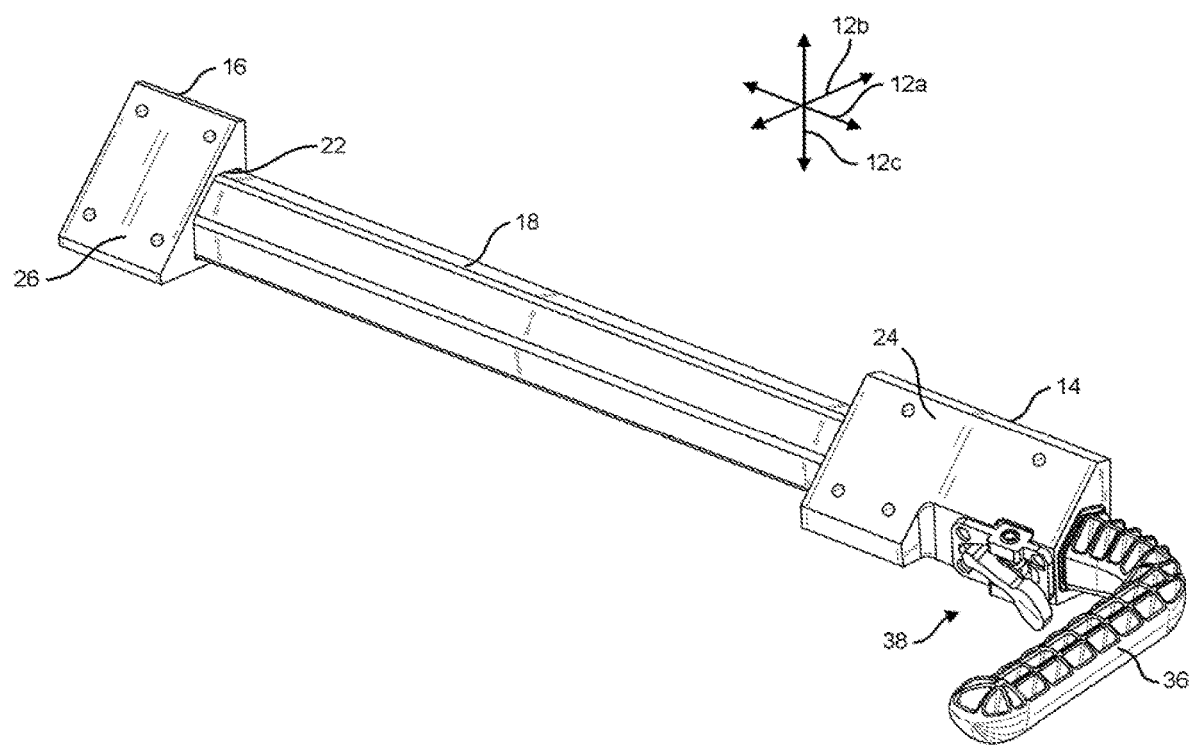
Figure 2:
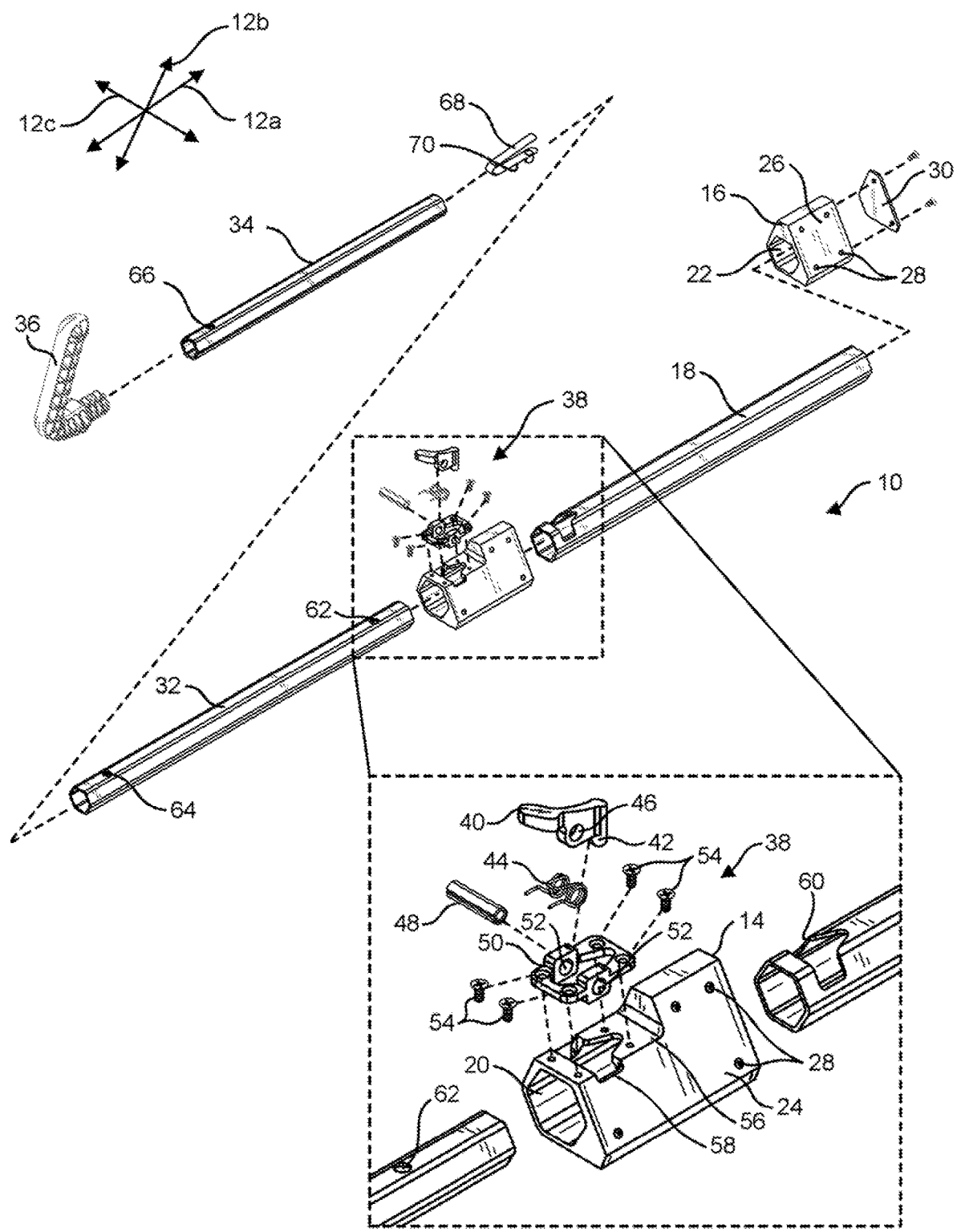
FIG. 2 is an exploded view of the handle assembly of FIGS. 1A and 1B.

Referring to FIGS. 1A, 1B and 2 a handle assembly 10 may be understood with respect to a longitudinal direction 12a, a vertical direction 12b, and a horizontal direction 12c that are mutually orthogonal. These directions are used to explain the relative orientation of components of the handle assembly 10 and may not correspond to actual longitudinal, horizontal, and vertical directions in use. Unless otherwise noted, the structures of the handle assembly 10 may be made of a rigid plastic, such as ABS (acrylonitrile butadiene styrene) or other plastic having sufficient strength. In other embodiments, the handle assembly 10 is made of metal (e.g., steel or aluminum), wood, composite material (e.g., carbon fiber) or some other material. The handle assembly 10 may be made of a combination of two or more of the above-noted materials.

The handle assembly 10 may include one or more mounts for securing to a suitcase. For example, in the illustrated embodiment, the mounts include an upper mount 14 and a lower mount 16. A sheath 18, embodied as a hollow tube may mount within the mounts 14, 16. For example, the mounts 14, 16 may define apertures 20, 22 extending therethrough in the longitudinal direction 12a. The sheath 18 may sit within the apertures 20, 22 and be secured thereto by means of screws, adhesive, interference fit or other securement means.

As is apparent in FIGS. 1A and 1B, the sheath 18 hay have a non-round shape in a plane parallel to the vertical and horizontal directions 12b, 12c. Accordingly, the apertures 20, 22 may have the same non-round shape. For example, in the illustrated embodiment, the non-round shape is a hexagon, such as a hexagon with rounded corners. However, in other embodiments, any shape with a least one flattened surface is used.

As discussed in greater detail below, the handle assembly 10 may secure to the outside of a case, such as in one corner thereof. Accordingly, the mounts 14, 16 may be sized to occupy the corner of the case. For example, the mounts 14, 16 may have a cross-sectional shape perpendicular to the longitudinal direction 12a such that there are surfaces of the mounts 14, 16 that lie on an isosceles triangle, with surfaces 24, 26 lying on the base of the triangle interfacing with the case. For example, apertures 28 extending through the surfaces 24, 26 may receive screws or other fasteners for securing the mounts 14, 16 to a case. As is apparent in FIGS. 1 and 2, although generally triangular, the mounts 14, 16 may have flattened or rounded corners.

In some embodiments an end plate 30 secures to a bottom of the mount 16 to cover the aperture 22. The end plate 30 may also have a perimeter corresponding in size and shape to the cross-sectional shape of the mount 16 perpendicular to the longitudinal direction 12a.

Referring specifically to FIG. 2, the handle assembly 10 may include a telescoping handle and shaft that secures within the sheath 18. For example, the telescoping handle may include a middle shaft 32 that slides within the sheath 18 and an end shaft 34 that slides within the middle shaft 32. A handle 36 mounts to a free end of the end shaft 34. As is apparent in FIGS. 1 and 2, the shafts 32, 34 may also have hexagonal (e.g., rounded or chamfered hexagonal) cross-sections perpendicular to the longitudinal direction 12a. The shafts 32, 34 are both hollow in the illustrated embodiment such that the opening extending through the shafts 32, 34 is also hexagonal (e.g., rounded or chamfered hexagonal).

A latching mechanism 38 may be used to secure the shafts 32, 34 in a retracted position and to maintain the middle shaft 32 in an extended position relative to the sheath 18. In the illustrated embodiment, the latching mechanism 38 includes a lever 40 having a locking pin 42 at one end. The lever 40 is pivotally mounted to the upper mount 14 and includes a biasing member 44 (e.g., steel coil spring) that urges the locking pin 42 inwardly toward the upper mount 14. In the illustrated embodiment, the lever 40 defines a pivot aperture 46 that receives a pivot pin 48. A mounting bracket 50 may fasten to the upper mount 14 and define pin apertures 52. The pivot aperture 46 is positioned between the apertures 52 and the pivot pin 48 is inserted through the apertures 46, 52. The mounting bracket 50 may be mounted to the upper mount by means of fasteners 54 such as screws. As is apparent the pivot pin 48 may define an axis of rotation that is substantially perpendicular (e.g., within 5 degrees) to the longitudinal direction 12a and may be substantially parallel (e.g., within 5 degrees) to the horizontal direction 12c.

As shown in FIG. 2, the upper mount 14 may include a flattened and/or recessed portion 56 to which the mounting bracket 50 fastens. In the illustrated embodiment, this includes a recessed flattened portion 56 that is parallel to a first leg of the isosceles right triangle defined by the mount 14 and that is not the base. The recessed flattened portion 56 may further intersect the base and a second leg of the isosceles right triangle that is not the base.

The upper mount 14 further defines an aperture 58 through the recessed flattened portion 56 that permits the locking pin 42 to pass through into the aperture 20 and engage the shafts 32, 34. The sheath 18 includes a corresponding aperture 60 that is aligned with the aperture 58 when the sheath 18 is mounted within the aperture 20 thereby permitting the locking pin 42 to pass through and engage one or both of the shafts 32, 34. In the illustrated embodiment, the aperture 60 is sized to conform to the shape of the aperture 58.

Figure 3:
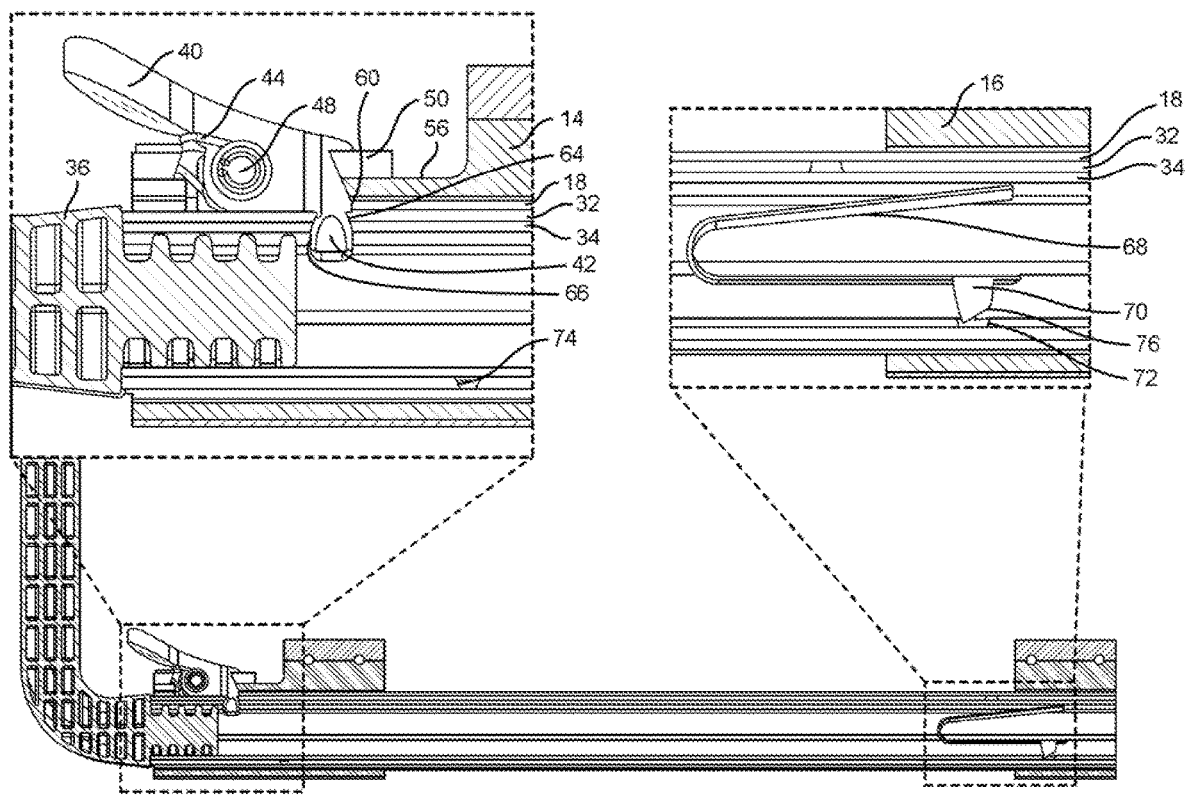
FIG. 3 is cross-sectional view of the handle assembly of FIGS. 1A and 1B in a retracted state in accordance with an embodiment of the present invention.

As shown in FIGS. 2 and 3, the middle shaft 32 defines a bottom aperture 62 and a top aperture 64, both facing the apertures 58, 60 and offset from one another along the middle shaft 32, such as by between 70 and 90 percent of the length of the middle shaft 32. The end shaft 34 further defines an aperture 66 facing the apertures 58, 60 and located closer to a distal end (the end farthest from the mount 14 when extended) than to a proximal end. For example, the aperture 66 may be within 10 percent of the length of the end shaft 34 from the distal end. When in the retracted position, the locking pin 42 passes through the apertures 58, 60 and through the top aperture 64 and the aperture 66. When extended, the locking pin 42 passes through the bottom aperture 62.

As is apparent, the apertures 62, 64, 66 are located close to the ends of the shafts 32, 34 but are offset inwardly from the ends of the shafts 32, 34 in which they are formed. The offset inward from the ends of the shafts 32, 34 may be selected subject to the strength of the materials forming the shafts 32, 34. For example, the inward offset may be selected to prevent the locking pin 42 from tearing through the amount of material between a given aperture 62, 64, 66 and the end of the shaft 32, 34 in which it is formed. The inward offset may also be selected to increase the amount of overlap between the shafts 32, 34 and between the shaft 32 and the sheath 18 when extended in order to increase the stiffness of the handle assembly 10 when extended. For example, the inward offset may be between 1 and 3 inches in some embodiments. In other embodiments, the inward offset may be between 3 and 10 percent of the length of the shaft 32, 34 defining the inward offset. Note that the inward offsets for the apertures 62, 64, 66 need not be identical.

A detent clip 68 having a locking pin 70 formed or secured at one end may be positioned within the end shaft 34. The operation of the clip 68 and locking pin 70 is described below with respect to FIGS. 3 and 4.

Referring to FIG. 3, the end shaft 34 may further define an aperture 72 for receiving the locking pin 70. As shown the aperture 72 faces in an opposite direction along vertical direction 12b relative to the aperture 66 and is located at an opposite end of the shaft 34 from the aperture 66 along the longitudinal direction 12a, subject to the same inward offset constraints as discussed above, though not necessarily an equal inward offset.

When in the retracted position as shown in FIG. 3, the clip 68 urges the locking pin 70 into the aperture 72, which maintains the position of the clip 68.

Figure 4:
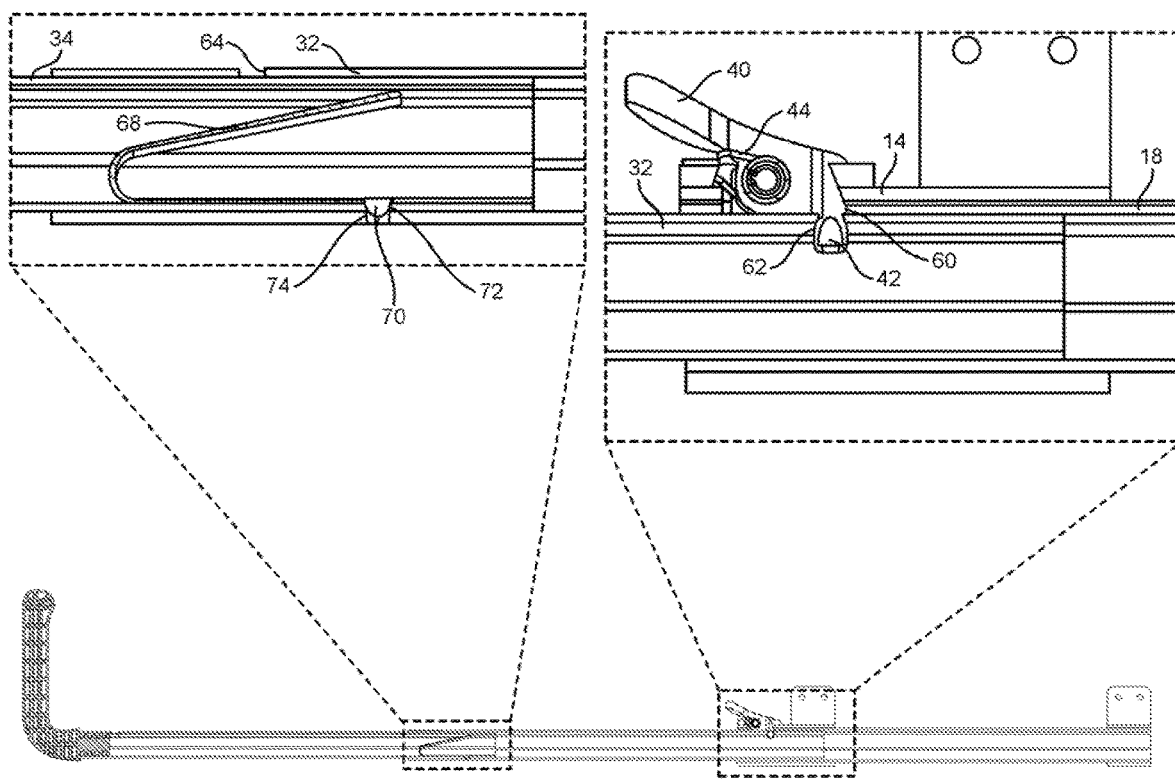
FIG. 4 is a cross-sectional view of the handle assembly of FIGS. 1A and 1B in an extended state in accordance with an embodiment of the present invention.

As shown in FIG. 4, when extended, the clip 68 urges the locking pin 70 further into the aperture 72 such that it protrudes into an aperture 74 formed in the middle shaft, i.e. at the same end as the top aperture 64 subject to the inward offset constraints as discussed above, though not necessarily an equal inward offset as the top aperture 64. In this manner, the locking pin 70 maintains the end shaft 34 in an extended position relative to the middle shaft.

Note that the locking pin 70 may gave a sloped end surface 76 (FIG. 3) in the plane parallel to the longitudinal and vertical directions 12a, 12b. In particular, the sloped surface slopes inward toward the end shaft 34 with distance along the longitudinal direction toward the end of the end shaft 34 closest to the aperture 72. In this manner, when retracting, the sloped surface 76 will engage the sheath 18 and/or the edges of the aperture 74, urging the locking pin 70 inward. Once urged inwardly sufficiently, the sloped surface 72 will also engage the middle shaft 34 around the edge of the aperture 74. Accordingly, force urging the end shaft 34 into the middle shaft 32 will urge the sloped surface 76 inwardly against the biasing force of the clip 68 and through the aperture 74 thereby disengaging the locking pin 70 from the middle shaft 34 and allowing the end shaft 34 to continue to retract into the middle shaft 32.

FIG. 4 shows an alternative implementation of the locking pin 70 that is embodied as a hemispherical shape, or a cylinder with a hemispherical shape at its distal end. The hemispherical shape likewise allowed for axial force on the end shaft 34 to urge the locking pin 70 against the aperture 74 and slide inward and disengage the locking pin 70 from the aperture 74.

FIGS. 3 and 4 further illustrate the operation of the locking mechanism 38. As shown in FIG. 3, when in the retracted position, the locking pin 42 extends through both apertures 64 and 66. By pressing on the lever 40, the locking pin 42 is urged out of the apertures 64, 66, permitting them to slide out of the sheath 18 into the position shown in FIG. 4. Once retracted until the locking pin 42 is aligned with the bottom aperture 62, the biasing member 44 urges the locking pin 42 into the aperture 62, thereby maintaining the middle shaft 32 in the extended position. To retract the middle shaft 32, the user again presses the lever 40 to urge the locking pin 42 out of the aperture 62 and urges the middle shaft 32 inwardly into the sheath 18 such that the aperture 62 is no longer aligned with the locking pin 42. The user may then release the lever 40 and continue to urge the middle shaft 32 inwardly into the sheath 18 until the upper aperture 64 is aligned with the locking pin 42. The end shaft 34 is also retracted into the middle shaft 32 as described above by disengaging the locking pin 70. The biasing member 44 then urges the locking pin 42 into the apertures 64 and 66.

FIGS. 3 and 4 show the handle 36 to be L-shaped such that it extends perpendicular to the longitudinal direction 12a and parallel to the vertical direction 12b. In some embodiments, the vertical direction 12b may be defined as parallel to the longest dimension of the handle 36 perpendicular to the longitudinal direction 12a and the horizontal direction 12c may be defined as perpendicular to the longitudinal direction 12a and parallel to the flattened, recessed surface 56.

In the illustrated embodiment, the handle 36 has only one point of attachment to the handle assembly and only one set of telescoping shafts 32, 34 and sheath 18 are used. The non-round shape of the shafts 32, 34 and sheath 18 resists rotation of the handle 36 about an axis parallel to the longitudinal direction 12a facilitating use of a single set of telescoping shafts 32, 34 and sheath 18.

FIG. 4 further illustrates an alternative approach for attaching the handle assembly 10 to a case. Rather than fastening surfaces 24, 26 to a case, the mounts 14, 16 may each include a pair of perpendicular flanges 78 that fasten to two surfaces of case, such as a front and side of a case, such as by means of screws.

In either attachment approach, the handle assembly 10 provides the advantage of securing to the exterior of the case and thereby reducing the amount of storage volume of the case taken up by the handle assembly 10. Likewise, by using a single handle assembly 10 configured to resist rotation, the amount of storage volume taken up by a telescoping handle is further reduced relative to the conventional approach that requires two telescoping shafts.

Figure 5:
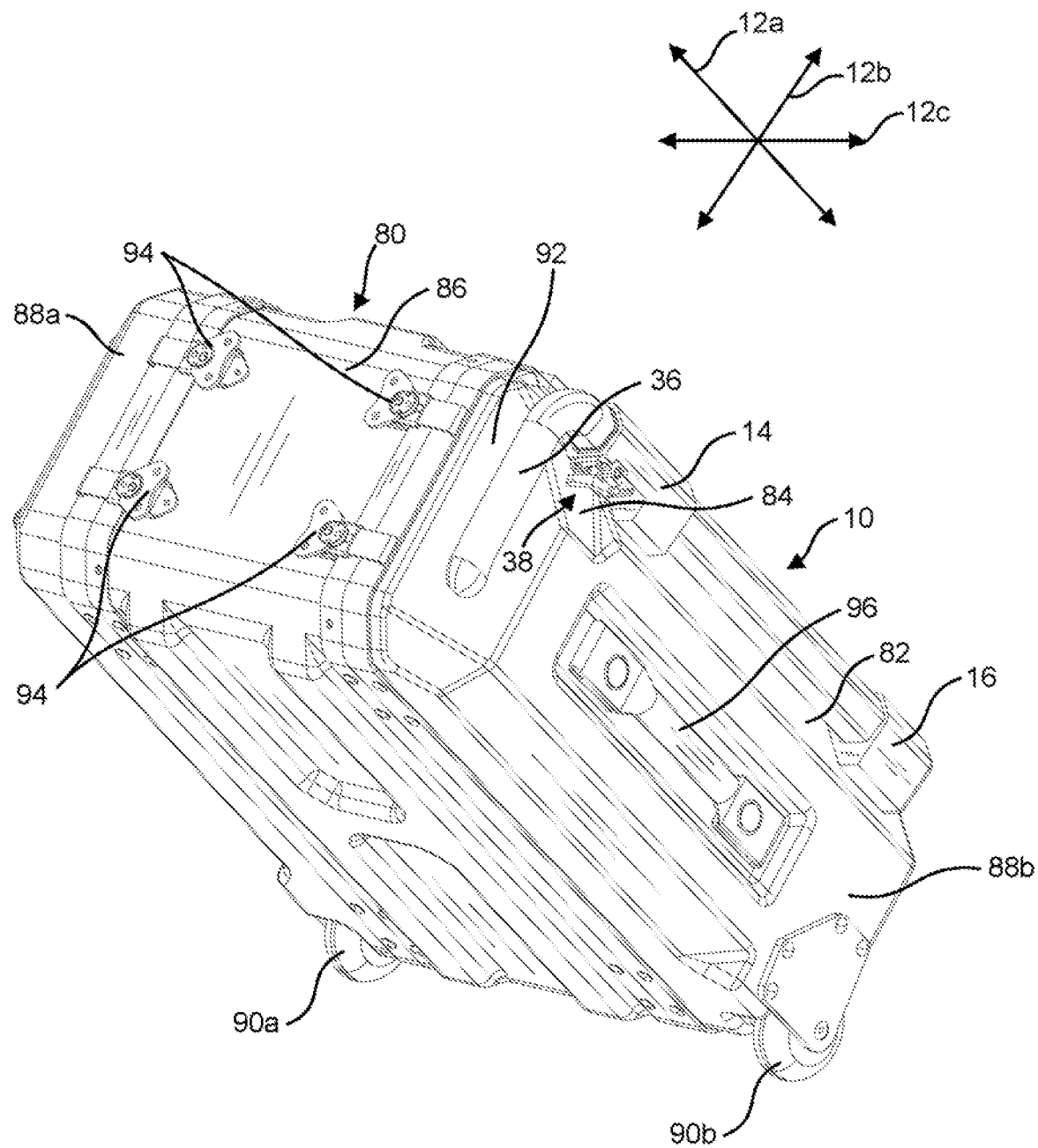
FIG. 5 is an isometric view of a suitcase including the handle assembly in accordance with an embodiment of the present invention.

As shown in FIG. 5, the handle assembly 10 may fasten to a suitcase 80 having a substantially cuboid shape. In particular, a cuboid may be defined bounding the suitcase 80 such that 95 percent of the exterior surface of the suitcase 80 is offset from the cuboid by less than 10 percent of a smallest dimension of the cuboid. In another definition, the suitcase 80 is substantially cuboid when a cuboid can be defined such that at least 50 percent, such as at least 70 percent, of each surface of the suitcase 80 is substantially parallel (e.g., within 5 degrees) to at least one face of the cuboid.

As shown in FIG. 5, a suitcase 80 may have a cuboid shape such that the handle assembly 10 is placed along one edge of the cuboid shape, such as the edge between the rear surface and right surface as shown. Accordingly, the longitudinal direction 12a defined by the handle assembly 10 is substantially parallel (e.g., within 5 degrees) to that edge of the cuboid shape defined by the suitcase 80.

The suitcase 80 may include a flattened region 82 for receiving the mounts 14, 16. In the illustrated example, the flattened region is at a 45 degree angle relative to the back and right sides of the cuboid shape defined by the suitcase 80. The surfaces 24, 26 may then mount to the region 82, such as by means of screws.

In the illustrated embodiment, an additional recess 84 is defined in a region around the latching mechanism 38 to permit access to the lever 40. Accordingly, the recess 84 may extend inwardly into the suitcase 80 to a greater extent than the flattened region 82.

In the illustrated example, the suitcase 80 includes a central body 86 defining a portion of the storage volume. As is apparent, the central body 86 defines a portion of the front, rear, top, and bottom of the suitcase 80. The central body 86 is open at one or both of its left and right sides. Lids 88a, 88b secure over one or both of the left and right sides of the central body. As is apparent, the lids 88a, 88b have convex outer surface and have a corresponding concave inner surface such that the lids 88a, 88b include a portion of the storage volume of the suitcase 80 along with the central body.

In the illustrated example, the flattened portion 82 and recess 84 are defined on one of the lids 88b. In the illustrated embodiment, each lid 88a, 88b has a roller 90a, 90b protruding from one corner thereof such that when both lids 88a, 88b are attached to the central body 86, the suitcase 80 is rollable on the rollers 90a, 90b. In particular, when the lids 88a, 88b are secured to the central body 86, the axes of the rollers 90a, 90b may be substantially collinear, e.g., a line passing through the centers of both rollers 90a, 90b is within 5 degrees of parallel to the axes of rotation of both rollers 90a, 90b. The axes of rotation of the rollers 90a, 90b may be substantially parallel (e.g., within 5 degrees) to the horizontal direction 12c defined by the handle assembly 10.

As shown in FIG. 5, the long dimension of the handle 36 perpendicular to the longitudinal direction 12a may be oriented both perpendicular to the edge along which the sheath 18 is mounted and to the axis of rotation of the rollers 90a, 90b. The lid 88b to which the handle mounts may include a beveled 92 portion or other cutaway or recessed portion to permit the end shaft 34 and middle shaft 32 to be completely retracted without the handle 36 interfering with the lid 88b. Accordingly, when retracted, the handle 36 may be located completely within the cuboid shaft defined by the suitcase 80 as described above.

The lids 88a, 88b may secure to the central body 86 by means of latches 94 that may be embodied as any latching mechanism known in the art. One or both of the lids 88a, 88b may have handles 96 to facilitate carrying.

Figure 6:
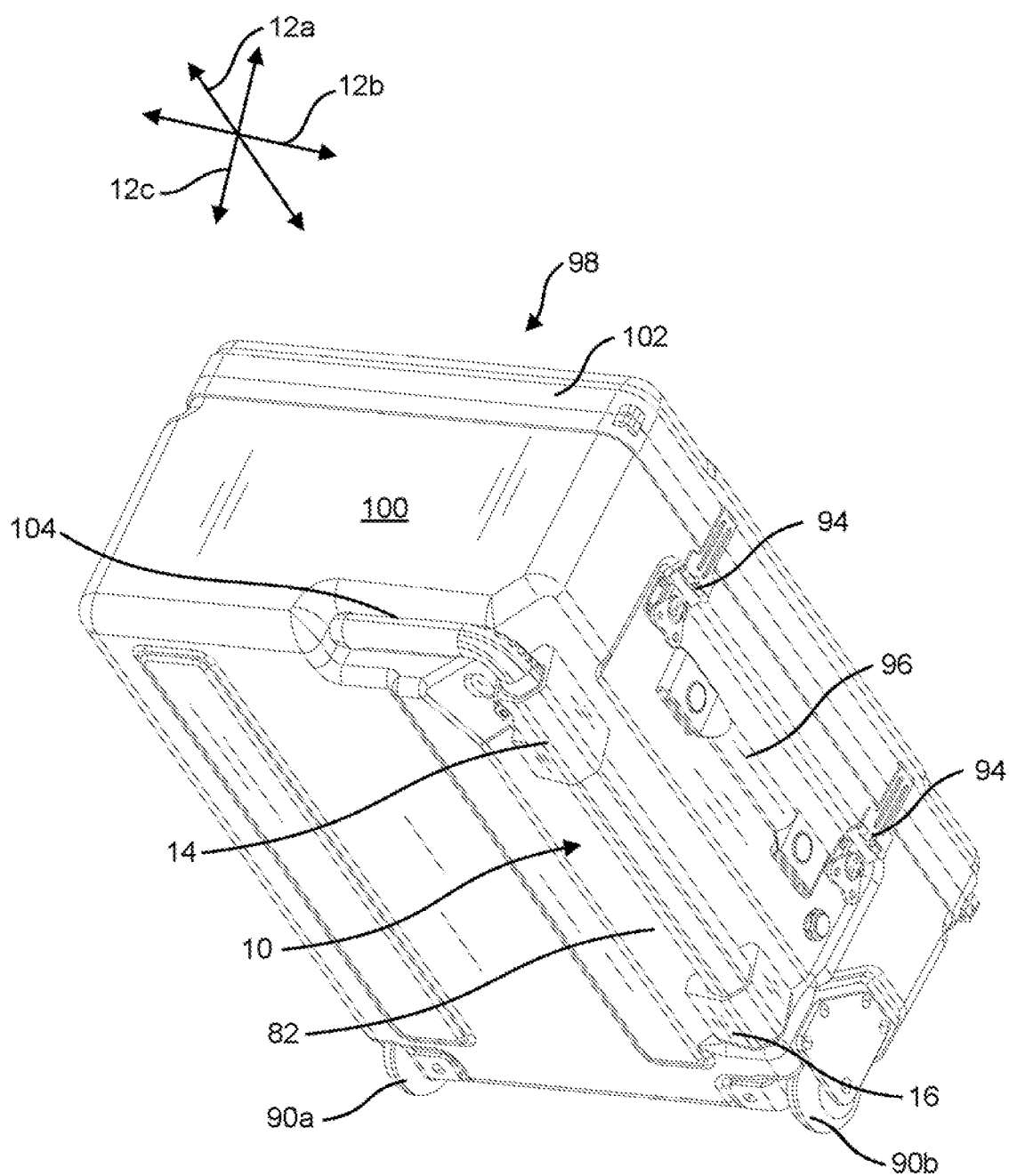
FIG. 6 is an isometric view of another embodiment of a suitcase including the handle assembly in accordance with an embodiment of the present invention.
Figure 7A:
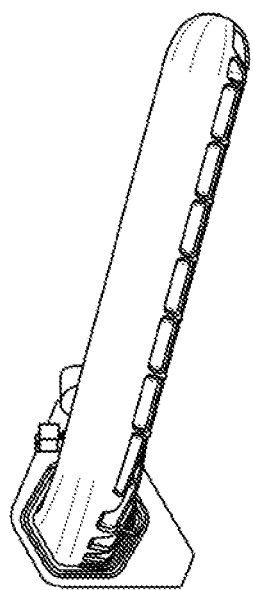
FIG. 7A is a top view of the handle assembly of FIGS. 1A and 1B.
Figure 7B:
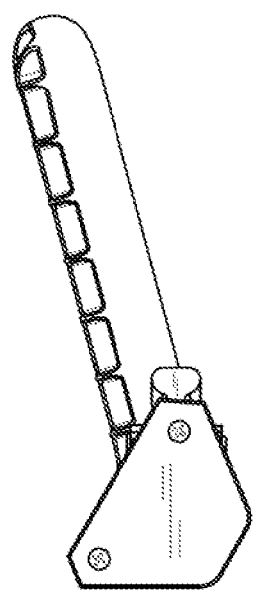
FIG. 7B is a bottom view of the handle assembly of FIGS. 1A and 1B.
Figure 7C:
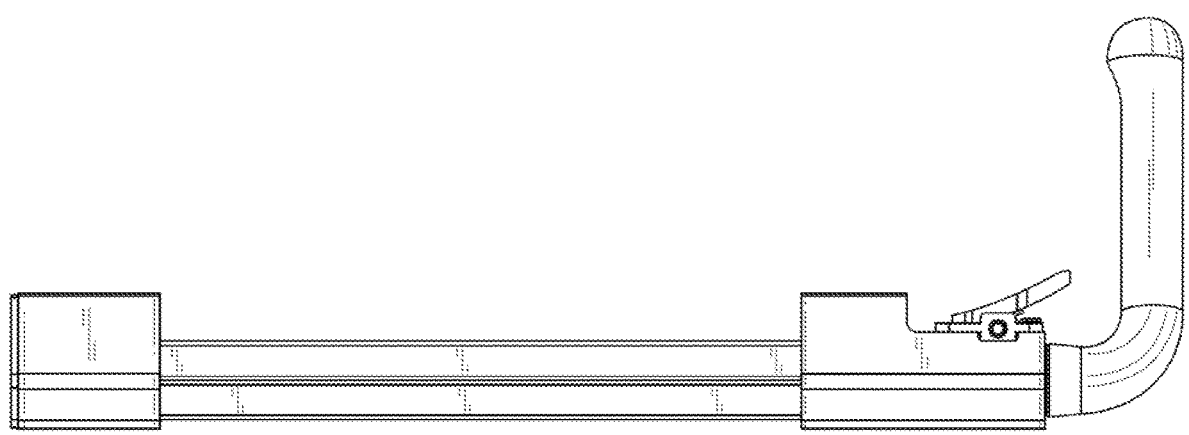
FIG. 7C is a right side view of the handle assembly of FIGS. 1A and 1B.
Figure 7D:
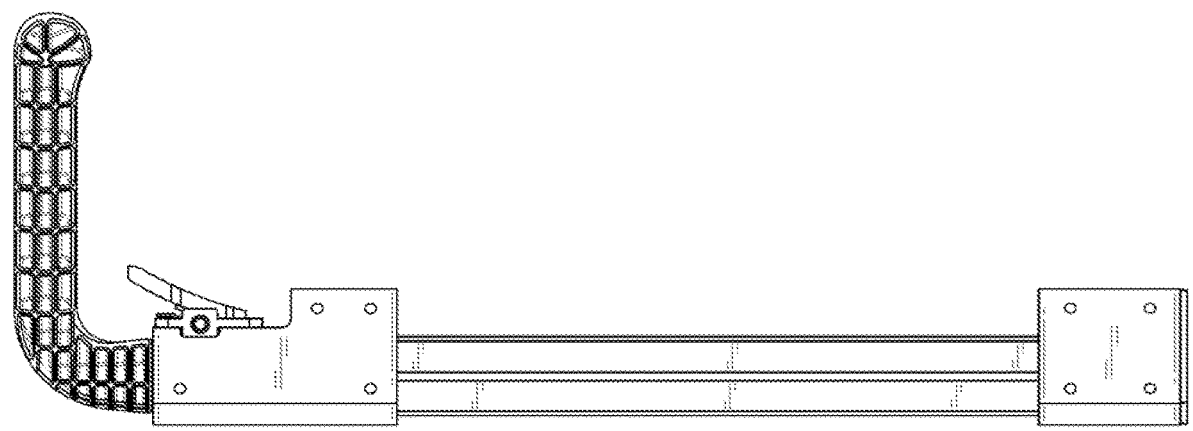
FIG. 7D is a left side view of the handle assembly of FIGS. 1A and 1B
Figure 7E:
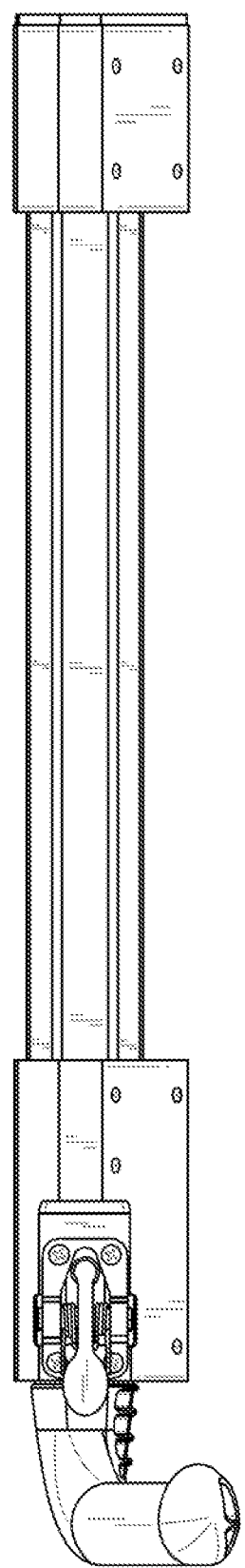
FIG. 7E is a rear view of the handle assembly of FIGS. 1A and 1B.
Figure 7F:
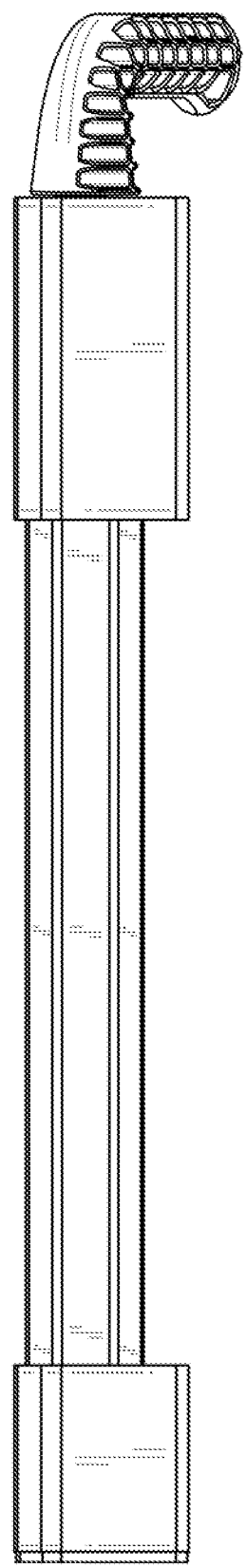
FIG. 7F is a front view of the handle assembly of FIGS. 1A and 1B.
Figure 8A:
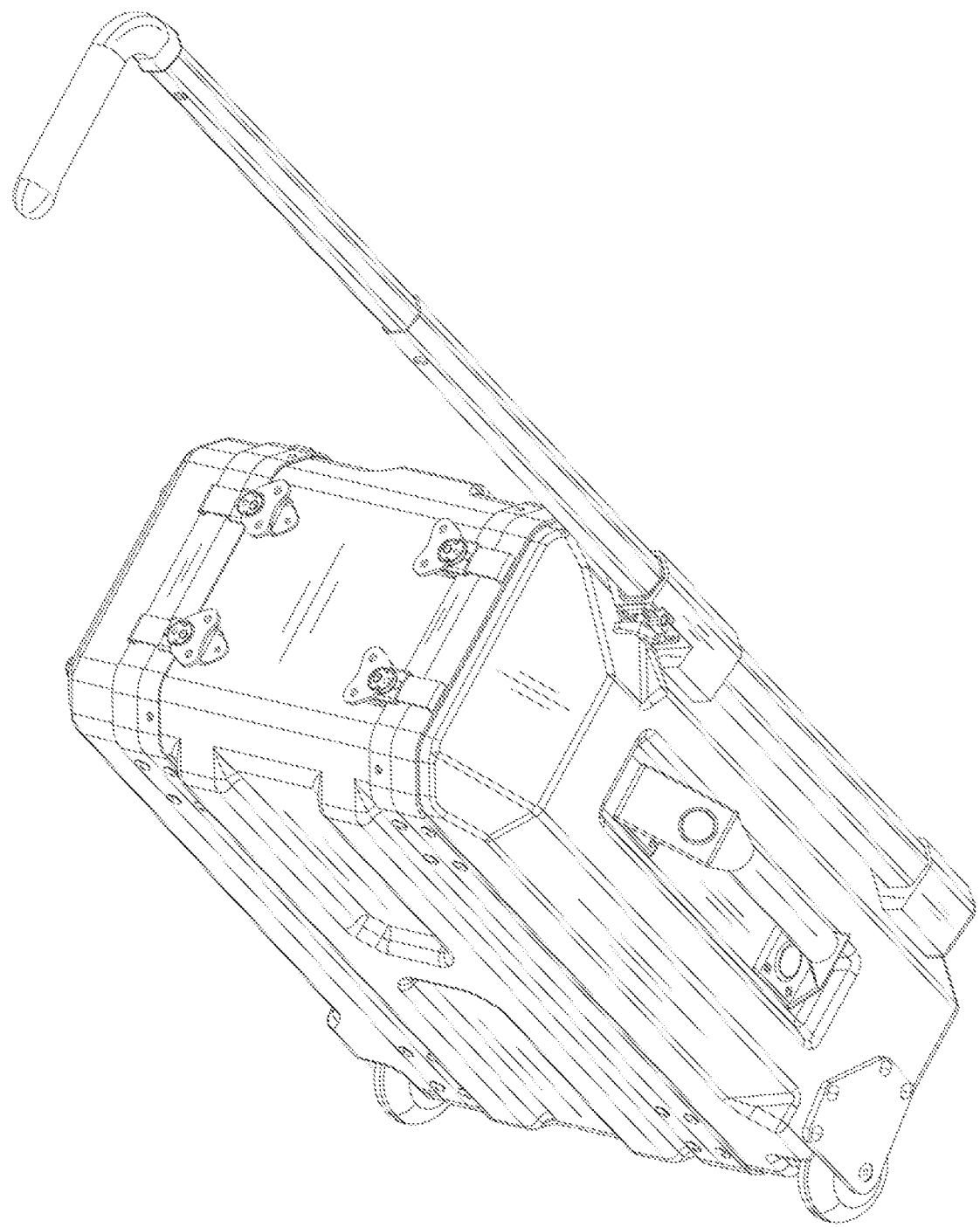
FIG. 8A is an isometric view of the case of FIG. 5 with the handle extended.
Figure 8B:
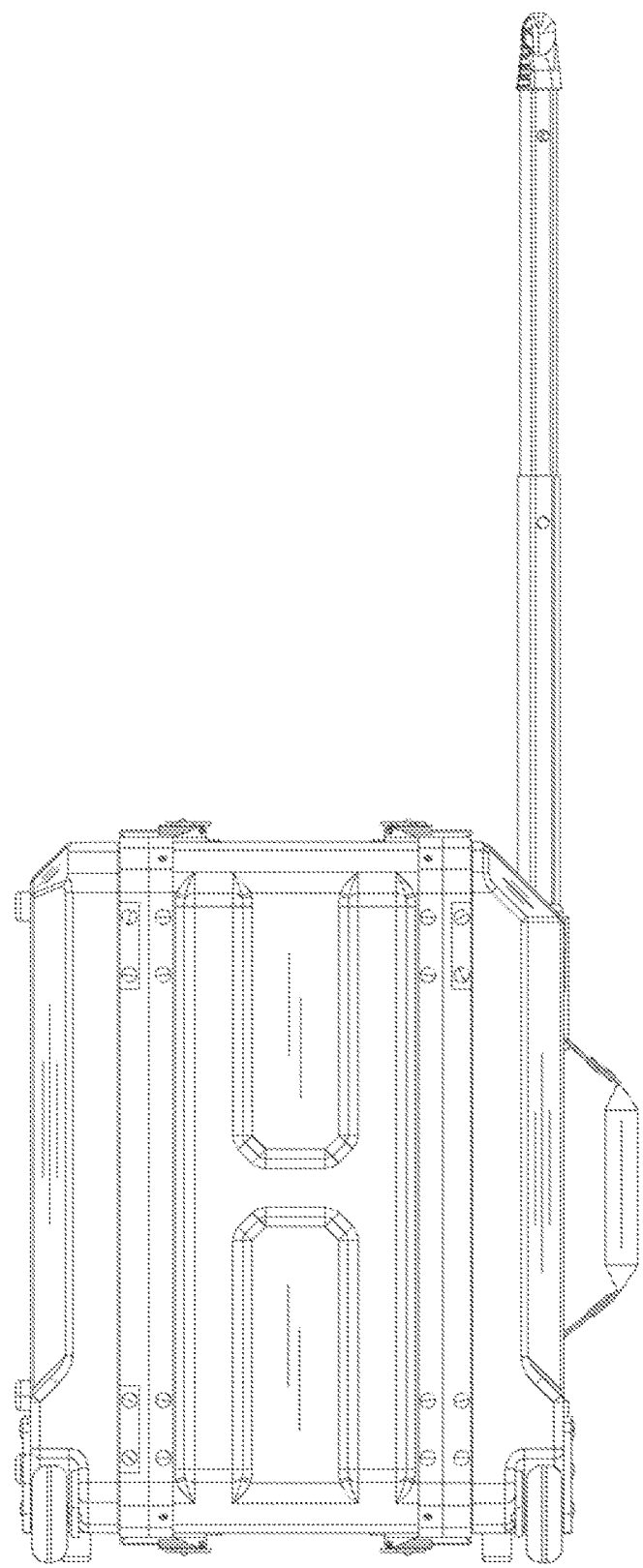
FIG. 8B is a front view of the case of FIG. 5 with the handle extended.
Figure 8C:
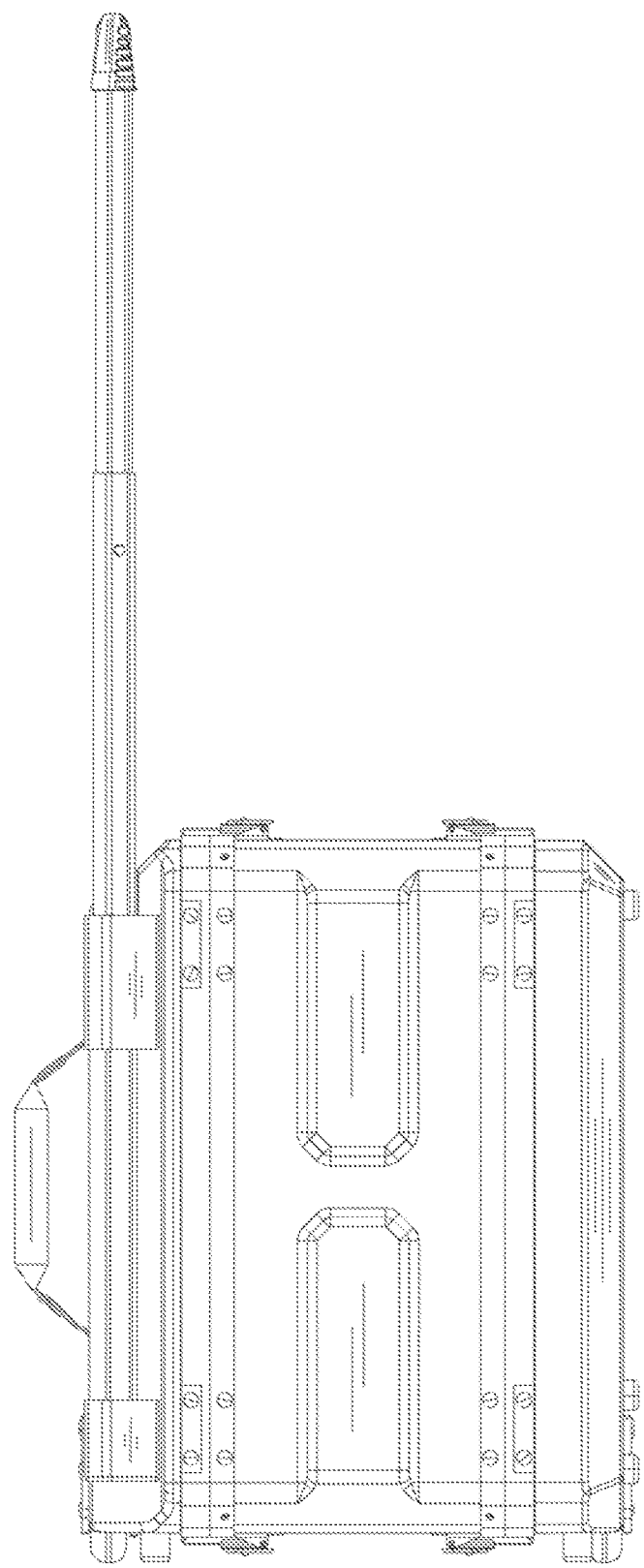
FIG. 8C is a rear view of the case of FIG. 5 with the handle extended.
Figure 8D:
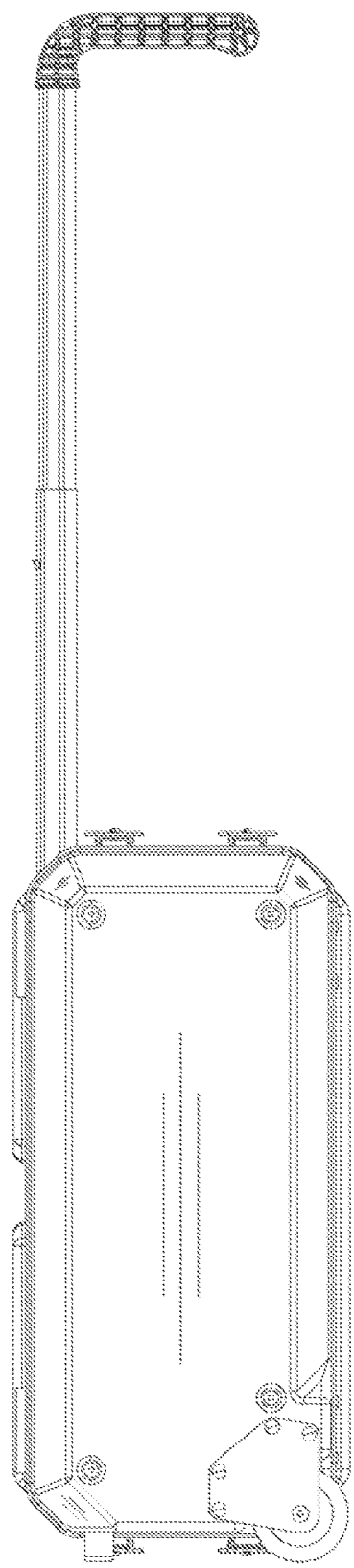
FIG. 8D is a is a left side view of the case of FIG. 5 with the handle extended.
Figure 8E:
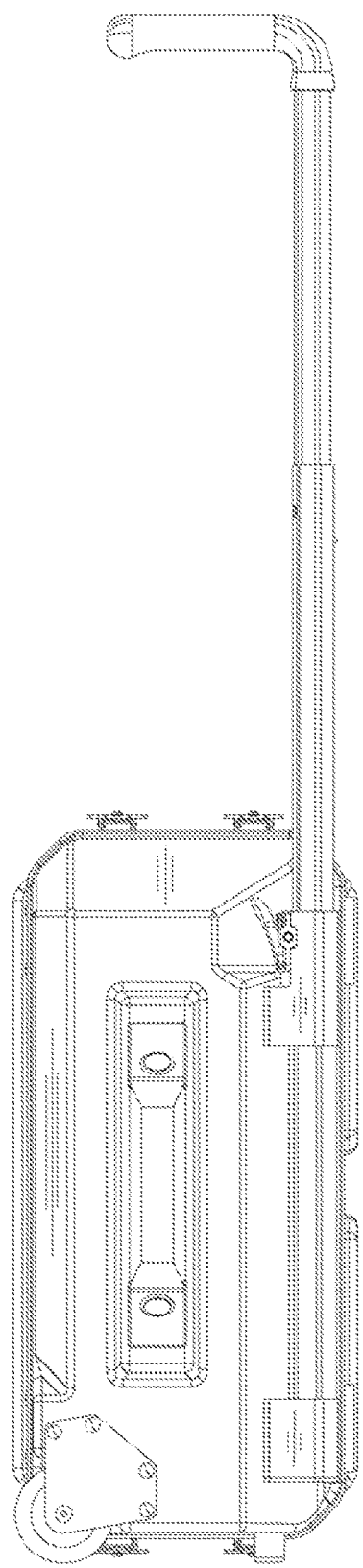
FIG. 8E is a is a right side view of the case of FIG. 5 with the handle extended.
Figure 8F:
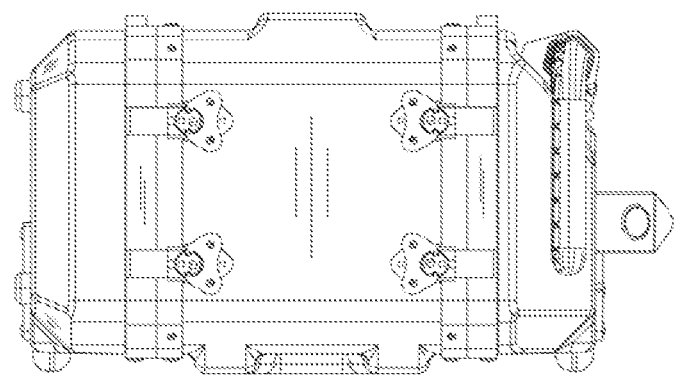
FIG. 8F is a top view of the case of FIG. 5 with the handle retracted.
Figure 8G:
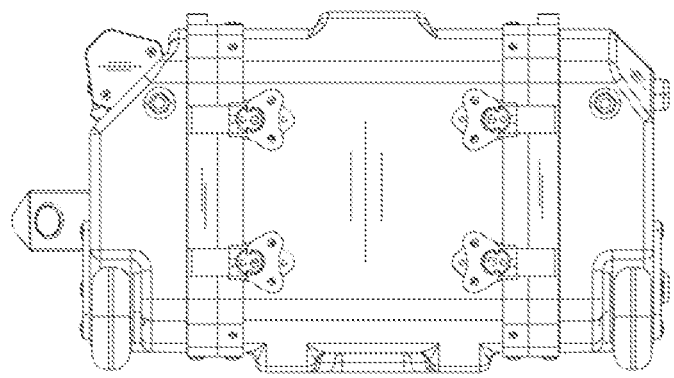
FIG. 8G is a bottom view of the case of FIG. 5 with the handle retracted.
Figure 9A:
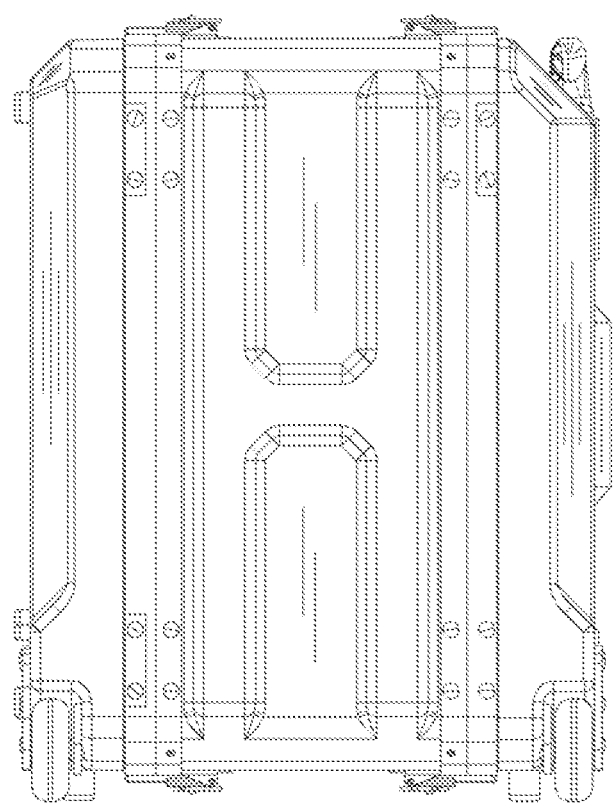
FIG. 9A is a front view of the case of FIG. 5 with the handle retracted.
Figure 9B:
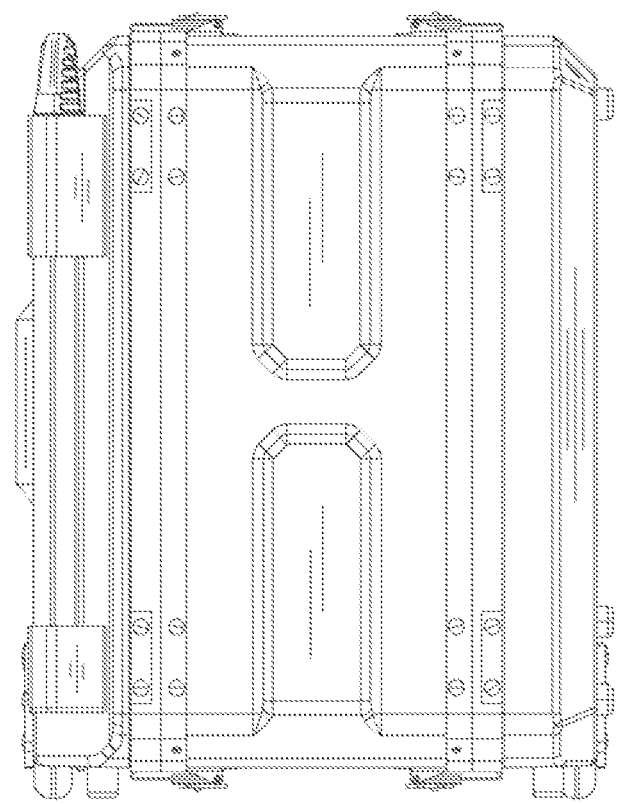
FIG. 9B is a rear view of the case of FIG. 5 with the handle retracted.
Figure 9C:
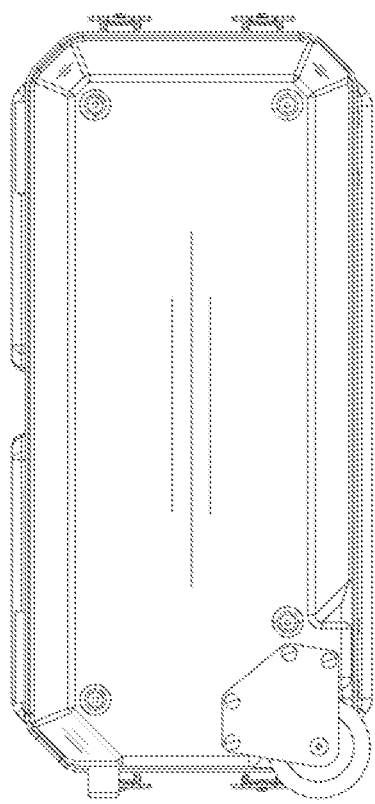
FIG. 9C is a is a left side view of the case of FIG. 5 with the handle retracted.
Figure 9D:
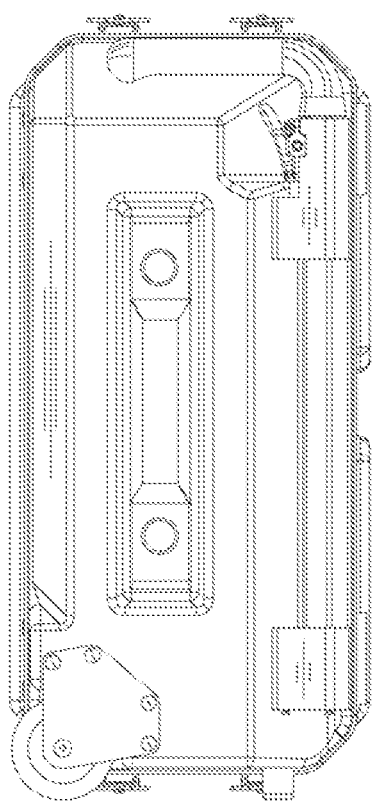
FIG. 9D is a is a right side view of the case of FIG. 5 with the handle retracted.
Figure 9E:
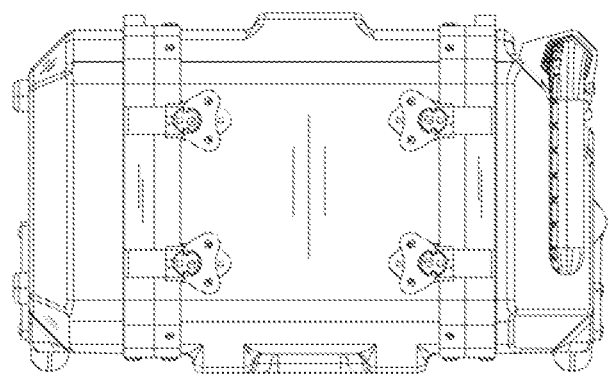
FIG. 9E is a top view of the case of FIG. 5 with the handle retracted.
Figure 9F:
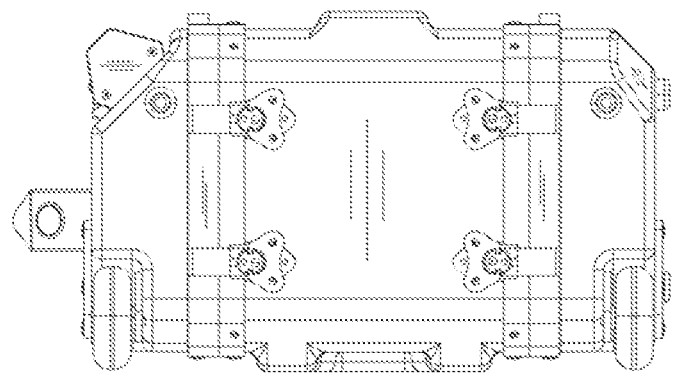
FIG. 9F is a bottom view of the case of FIG. 5 with the handle retracted.
Figure 10A:
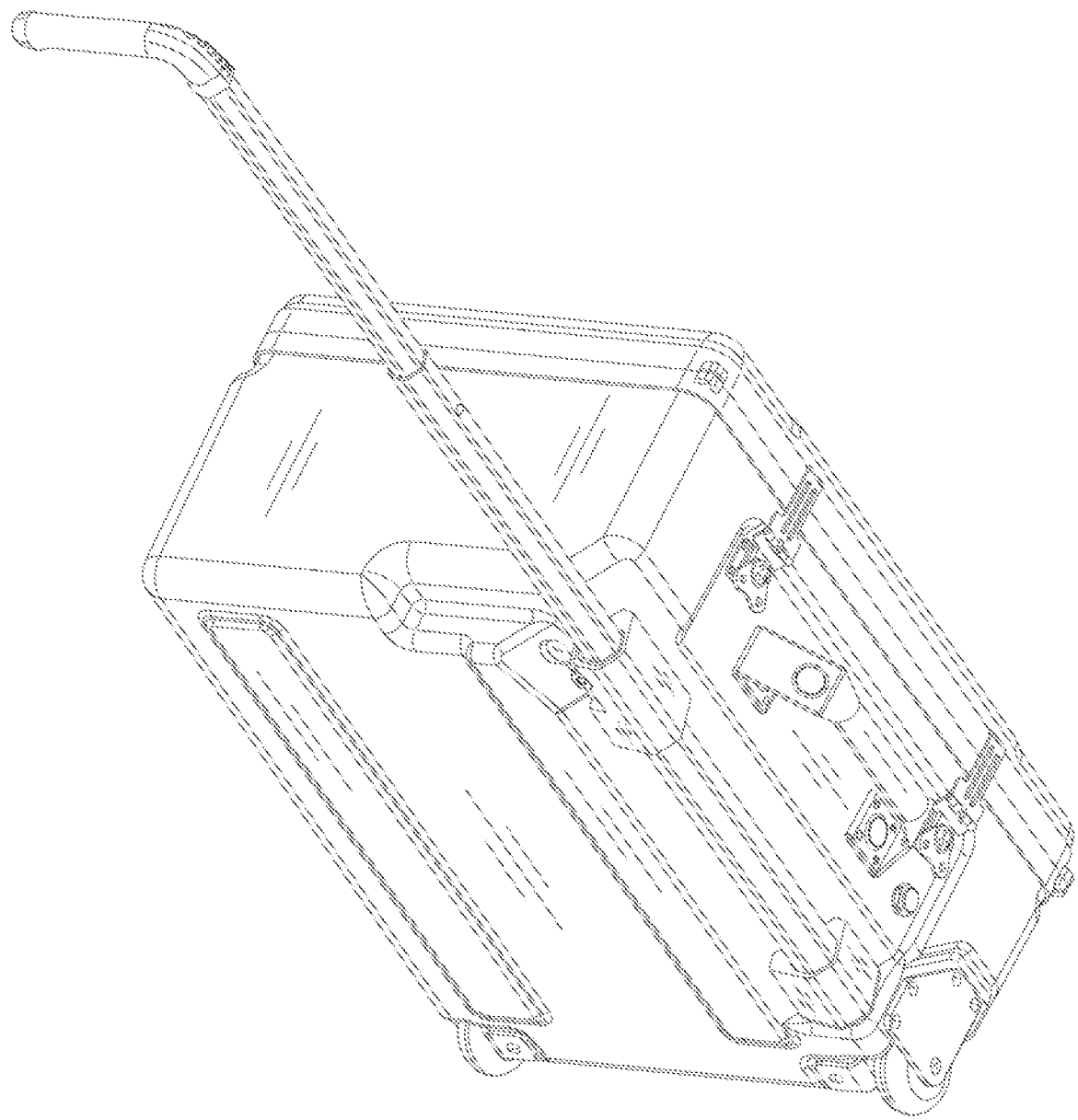
FIG. 10A is an isometric view of the case of FIG. 6 with the handle extended.
Figure 10B:
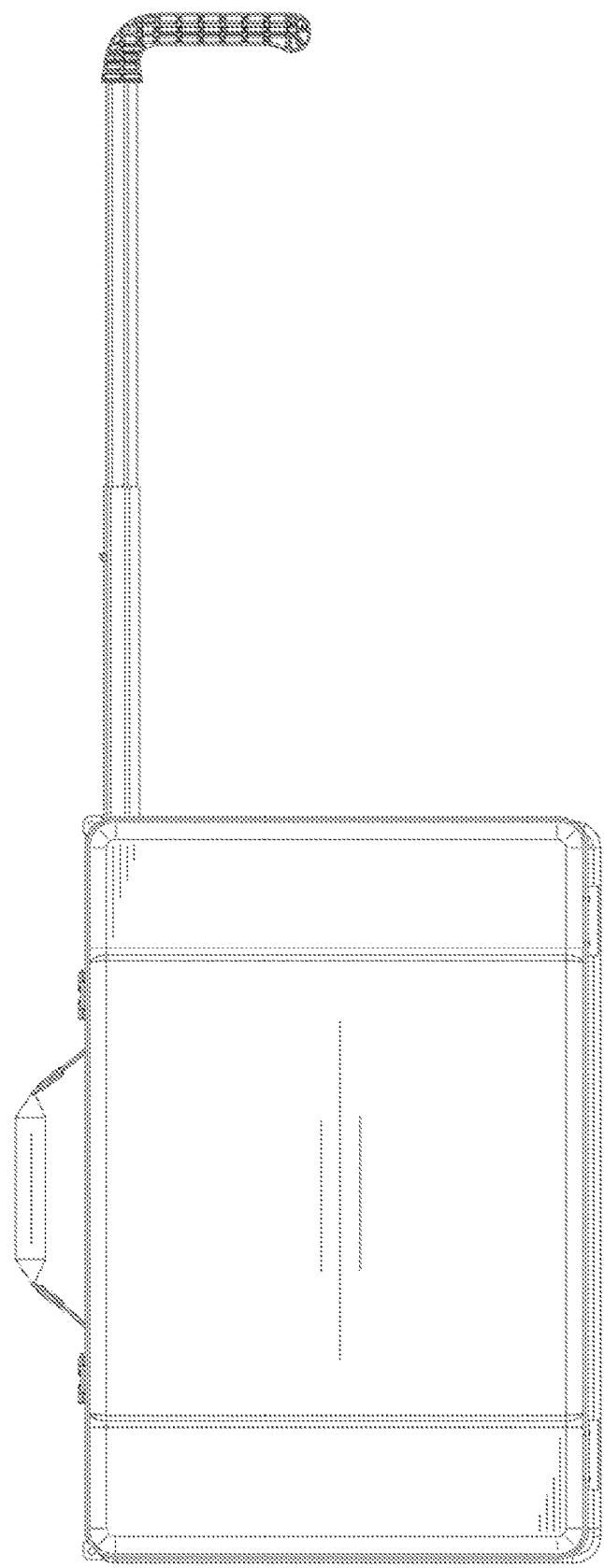
FIG. 10B is a rear view of the case of FIG. 6 with the handle extended.
Figure 10C:
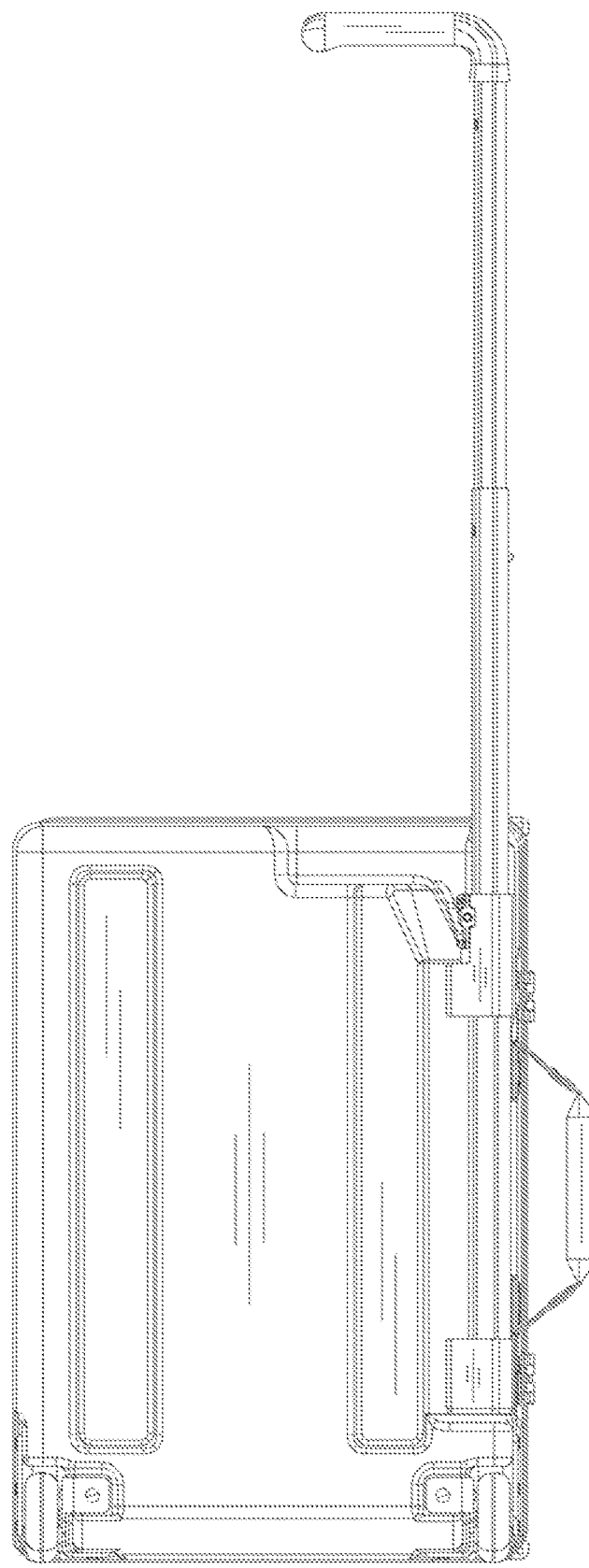
FIG. 10C is a front view of the case of FIG. 6 with the handle extended.
Figure 10D:
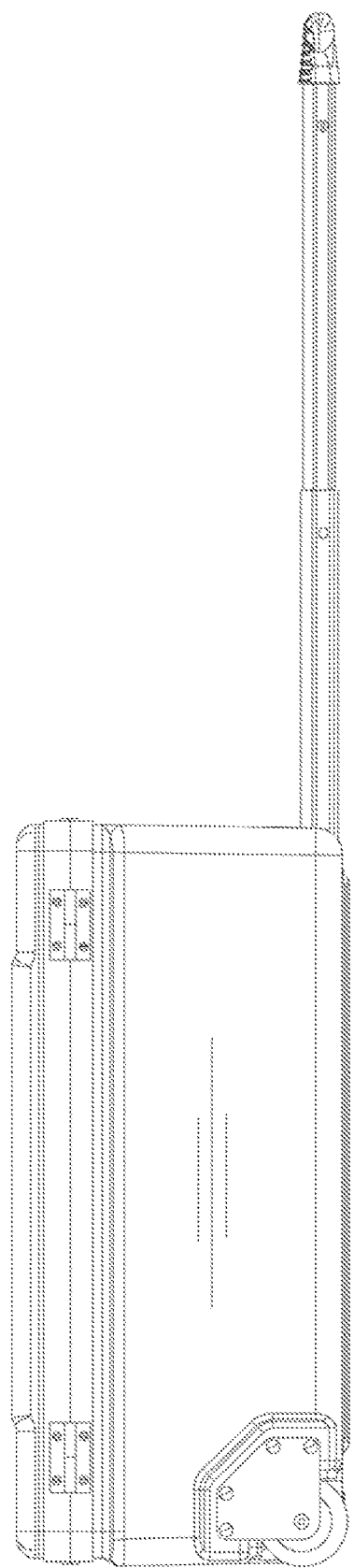
FIG. 10D is a is a left side view of the case of FIG. 6 with the handle extended.
Figure 10E:
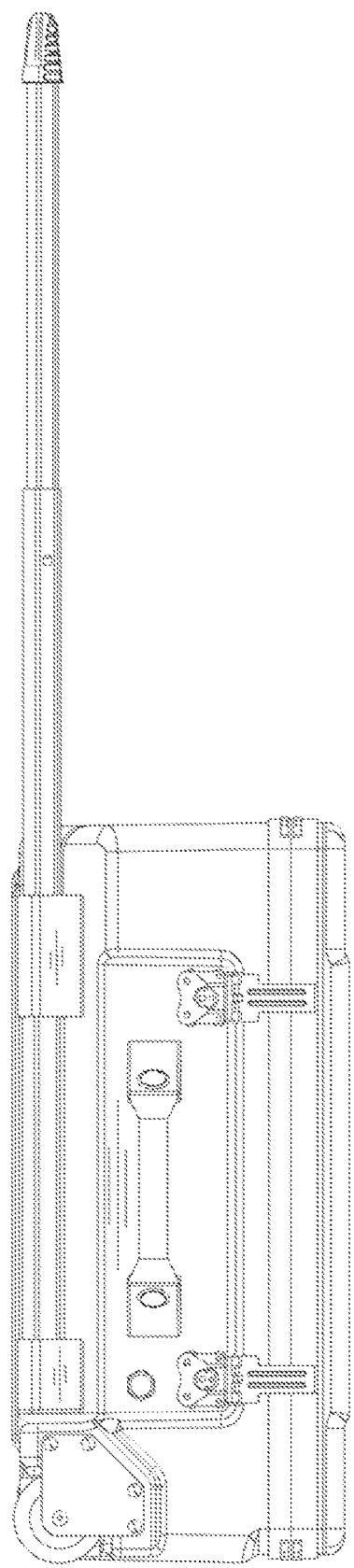
FIG. 10E is a is a right side view of the case of FIG. 6 with the handle extended.
Figure 10F:
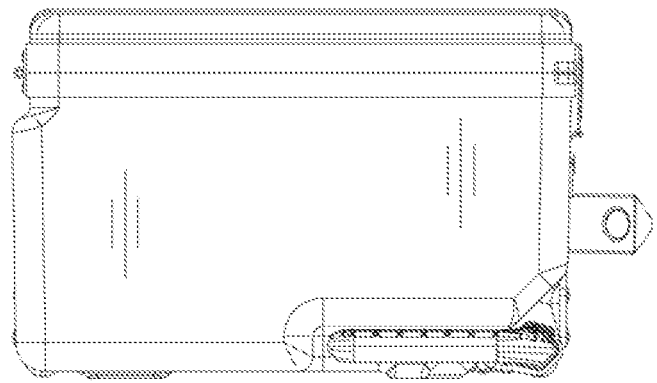
FIG. 10G is a bottom view of the case of FIG. 6 with the handle extended.
Figure 10G:
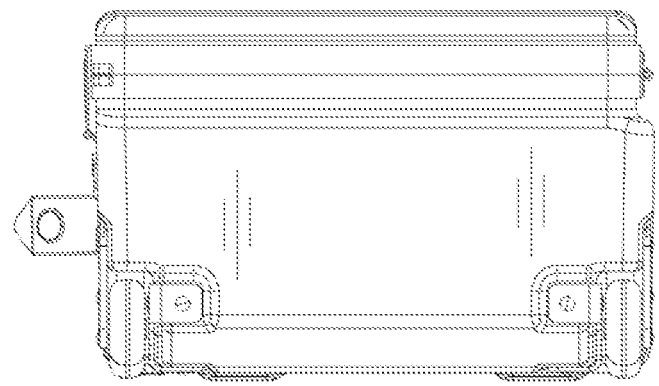
Figure 11A:
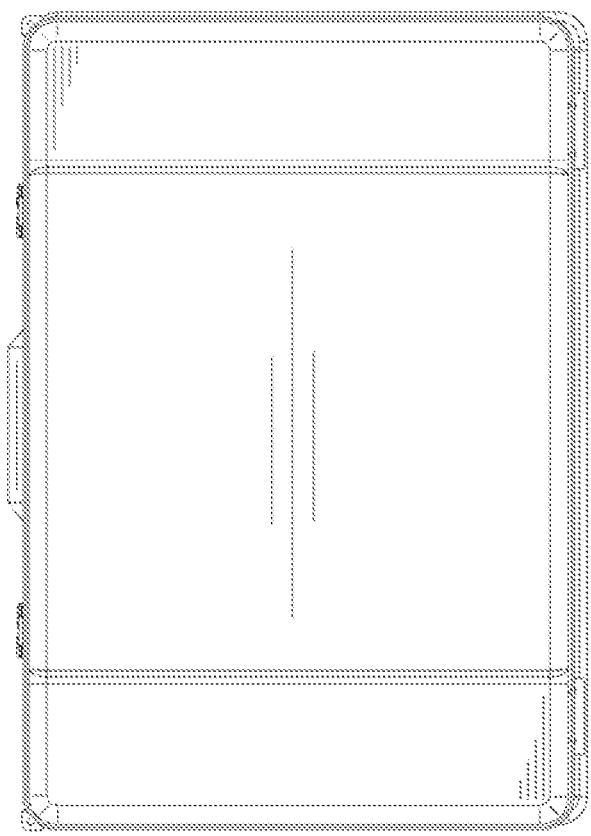
FIG. 11A is a rear view of the case of FIG. 6 with the handle retracted.
Figure 11B:
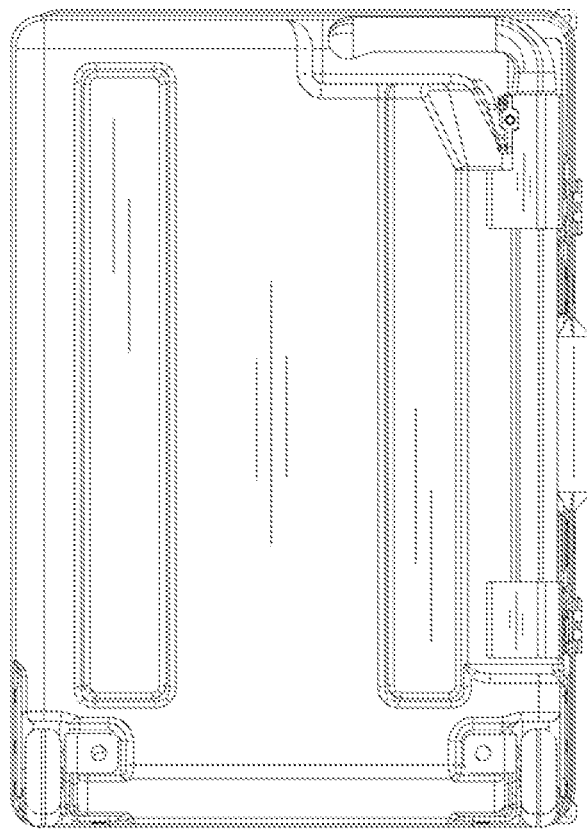
FIG. 11B is a front view of the case of FIG. 6 with the handle retracted.
Figure 11C:
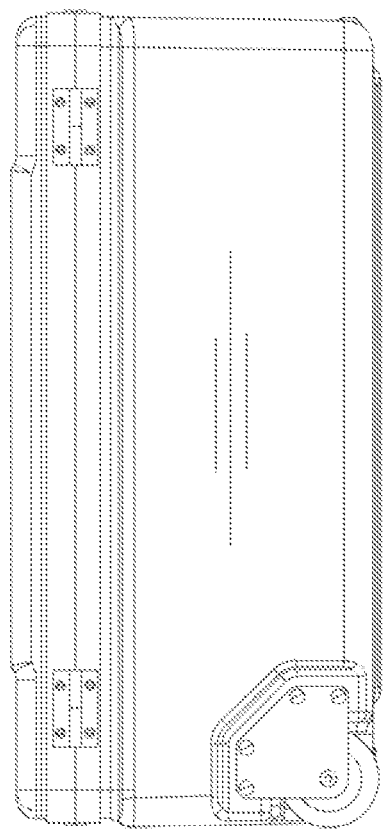
FIG. 11C is a is a left side view of the case of FIG. 6 with the handle retracted.
Figure 11D:
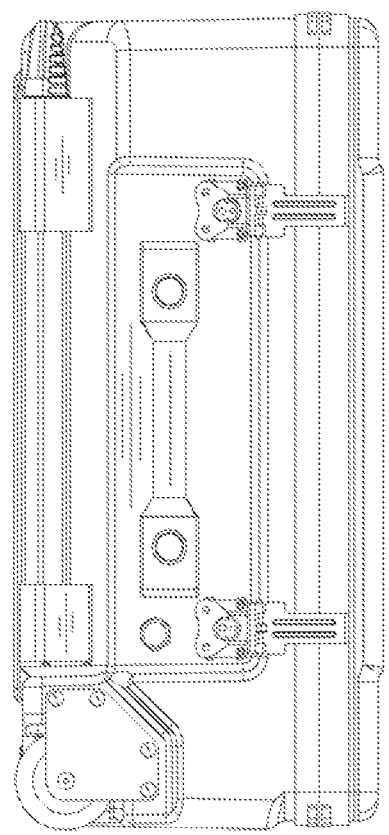
FIG. 11D is a is a right side view of the case of FIG. 6 with the handle retracted.
Figure 11E:
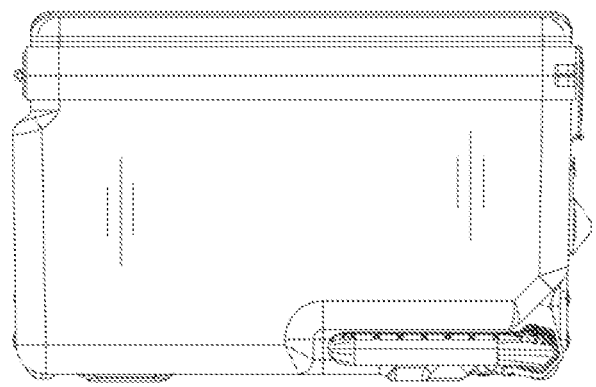
FIG. 11E is a top view of the case of FIG. 6 with the handle retracted.
Figure 11F:
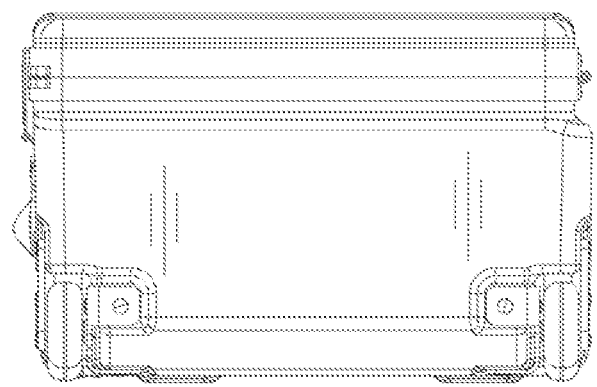
FIG. 11F is a bottom view of the case of FIG. 6 with the handle retracted.

FIG. 6 illustrates an alternative suitcase 98 that may likewise have a cuboid shape as defined with respect to the suitcase 80. In this embodiment, the flattened portion 82 and recess 84 are formed at the edge between the front surface and one of the side surfaces, the right surface in this example. In the embodiment of FIG. 6, the long dimension of the handle 36 perpendicular to the longitudinal direction 12a is oriented substantially parallel (within 10 degrees) to the axis of rotation of the rollers 90a, 90b.

In this embodiment, the body 100 of the suitcase 98 defines the front surface and at least a portion of the top, bottom, right, and left surfaces of the suitcase 90. The lid 102 forms the rear surface and may define portions of the top, bottom, right, and left surfaces as well. As for the embodiment of FIG. 5, the lid 102 may have a concave inner surface such that both the lid 102 and body 100 include portions of the storage volume of the suitcase 108. In the illustrated embodiment, the body 100 includes a recess 104 extending along the edge between the top and front surfaces for receiving the handle 36 when the handle assembly is retracted such that the handle is located within the cuboid shape defined by the suitcase 98 when retracted.

FIGS. 7A to 7F are other views of the handle assembly 10 providing a detailed understanding of its aesthetic appearance.

FIGS. 8A to 8F are other views of the suitcase 80 with the handle assembly 10 extended to provide a detailed understanding of its aesthetic appearance.

FIGS. 9A to 9F are other views of the suitcase 80 with the handle assembly 10 retracted to provide a detailed understanding of its aesthetic appearance.

FIGS. 10A to 10G are other views of the suitcase 98 with the handle assembly 10 extended to provide a detailed understanding of its aesthetic appearance.

FIGS. 11A to 11F are other views of the suitcase 98 with the handle assembly 10 retracted to provide a detailed understanding of its aesthetic appearance.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus comprising:
   a case body defining an interior volume for storage, the case body having a top surface, a bottom surface, a front surface, a rear surface, a left surface, and a right surface, the top, bottom, front, rear, left, and right surfaces substantially conforming to a cuboid shape;
   one and only one pull rod mounted to the case body and positioned along a first edge of the cuboid shape.

2. The apparatus of claim 1, wherein the first edge is positioned between the rear surface and one of the right surface and the left surface.

3. The apparatus of claim 2, further comprising one or more rollers mounted to the case body at a second edge of the cuboid shape positioned between the front surface and the bottom surface.

4. The apparatus of claim 3, wherein:
   the case body includes a central portion, a left lid, and a right lid, the left lid defining the left surface and the right lid defining the right surface;
   the pull rod is mounted to one of the right lid and the left lid; and
   the one or more rollers comprise a left roller mounted to the left lid and a right roller mounted to the right lid.

5. The apparatus of claim 1, wherein the pull rod includes multiple telescoping sections.

6. The apparatus of claim 5, wherein each telescoping section of the multiple telescoping sections has a non-round shape.

7. The apparatus of claim 6, wherein the non-round shape includes surfaces defining a hexagon.

8. The apparatus of claim 5, further comprising a latch secured to the case body and selectively engaging the multiple telescoping sections in a retracted position.

9. The apparatus of claim 8, further comprising a detent secured to a first section of the multiple telescoping sections and engaging an aperture in a second section of the multiple telescoping sections when the multiple telescoping sections are in an extended position.

10. The apparatus of claim 1, further comprising a handle secured to the pull rod, the handle extending inwardly from the first edge parallel to a second edge that is perpendicular to the first edge such that the pull rod and handle define an shape, the second edge being between the top surface and one of the right surface and the left surface.

11. The apparatus of claim 1, wherein the case body defines an indentation at the first edge sized to receive the pull rod.

12. The apparatus of claim 11, wherein the pull rod includes a static sleeve mounted in the indentation and one or more telescoping sections slidably secured within the static sleeve.

13. An apparatus comprising:
a case body having a front surface and a rear surface;
rollers mounted at the front surface and defining an axis of rotation;
one and only one pull rod mounted to an edge of the rear surface and having a long dimension of the pull rod oriented substantially perpendicular to the axis of rotation; and
a handle secured to the pull rod and extending inwardly from the edge of the rear surface toward the front surface and having a long dimension of the handle oriented substantially perpendicular to the axis of rotation and the long dimension of the pull rod.

14. The apparatus of claim 13, wherein the case body has a substantially cuboid shape.

15. The apparatus of claim 13, wherein the pull rod includes multiple telescoping sections.

16. The apparatus of claim 15, wherein each telescoping section of the multiple telescoping sections has a non-round shape.

17. The apparatus of claim 16, wherein the non-round shape has surfaces defining a hexagon.

18. The apparatus of claim 15, further comprising a latch secured to the case body and selectively engaging the multiple telescoping sections in a retracted position.

19. The apparatus of claim 13, wherein:
the case body defines an indentation at the edge of the first surface sized to receive the pull rod; and
the pull rod includes a static sleeve mounted in the indentation and one or more telescoping sections slidably secured within the static sleeve.

20. The apparatus of claim 19, wherein:
the case body includes a central portion, a left lid removably securable on a left side of the central portion, and a right lid removably securable on a right side of the central portion;
the pull rod is mounted to one of the right lid and the left lid; and
the rollers include a left roller mounted to the left lid and a right roller mounted to the right lid.

* * * * *

UNITED STATES PATENT AND TRADEMARK OFFICE
CERTIFICATE OF CORRECTION

PATENT NO. : 10,542,806 B2
APPLICATION NO. : 15/963065
DATED : January 28, 2020
INVENTOR(S) : Adrian Tayne Page 1 of 1

It is certified that error appears in the above-identified patent and that said Letters Patent is hereby corrected as shown below:

In the Claims

In Column 8, Line 32 (Claim 1), add --and-- after ";".

In Column 9, Line 2 (Claim 10), add --'L'-- before "shape".

Signed and Sealed this
Twenty-fourth Day of March, 2020

Andrei Iancu
*Director of the United States Patent and Trademark Office*